Sept. 18, 1956     O. MUELLER     2,763,351
POSITIVE CLUTCH AND BRAKE MECHANISM FOR PRESS
Filed Sept. 9, 1950     2 Sheets-Sheet 1

INVENTOR.
Otto Mueller.
BY
Harness, Dickey & Pierce
ATTORNEYS

Sept. 18, 1956  O. MUELLER  2,763,351
POSITIVE CLUTCH AND BRAKE MECHANISM FOR PRESS
Filed Sept. 9, 1950  2 Sheets-Sheet 2

INVENTOR.
Otto Mueller,
BY
Harness, Dickey & Pierce
ATTORNEYS.

United States Patent Office 2,763,351
Patented Sept. 18, 1956

2,763,351

POSITIVE CLUTCH AND BRAKE MECHANISM FOR PRESS

Otto Mueller, Dearborn, Mich.

Application September 9, 1950, Serial No. 184,053

10 Claims. (Cl. 192—17)

This invention relates to rotary clutch control mechanism, and more particularly to control mechanism for clutches of the rotary type such as rolling key type.

One of the primary objects of this invention is to provide a rolling key type clutch which may be disengaged at any point throughout the entire 360° rotation of the clutch members.

Another important object of the invention is to provide, in a rolling key type clutch, means which prevents a partial engagement of the clutch elements and thus obviates the possibility of damaging the engaging surfaces of the clutch.

Another object of the invention is to provide a rolling key type clutch which may be engaged at a plurality of points throughout the 360° rotation of the driving member of the clutch.

Another object of the invention is to provide, in a clutch of this type, a timing means, synchronized with the clutching elements, to ensure full clutch engagement at all times.

In the attainment of these objects and advantages, the invention contemplates the provision of friction type brake means to control the engagement and disengagement of the rolling key type clutch, operable at any time throughout the rotation of the clutch members. Thus the invention may be used to advantage in presses and the like wherein it has heretofore been possible to disengage the clutch and stop the press only at the end of the stroke, that is, after one complete revolution of the crank shaft or driven member of the press. Also included within the structure embodying this invention is a timing control latch means synchronized with the clutch grooves of the clutch mechanism to control the instant of clutch engagement to ensure full contact of the clutch elements.

Various other objects, advantages and novel details of construction of this invention will be made more apparent as this description proceeds, especially when considered in connection with the accompanying drawings, wherein.

Figure 1:
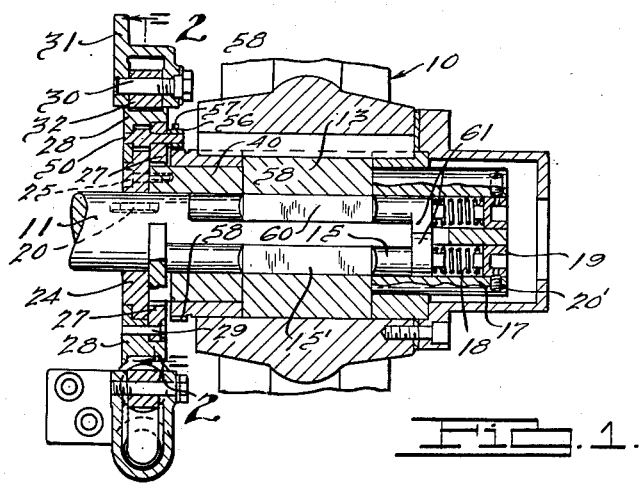
Figure 1 is an assembly view, with parts broken away and parts in section, of a clutch embodying the present invention.

Referring to the drawings, the present invention is directed to a clutch mechanism interposed between a driving member 10 and a driven member 11, which may comprise, respectively, the flywheel and crank shaft of a power press in which intermittent driving movements of the shaft 11 are to be imparted from the fly wheel 10.

The clutch per se forms no part of the present invention excepts as it enters into combination with the parts hereinafter described, the clutch being illustrated in the Otto Mueller Patent No. 2,045,483, issued June 23, 1936.

The flywheel 10 is provided with a hub 12 keyed to a clutch collar 13 surrounding a shaft or driven member 11. The clutch collar 13 is provided with a plurality of spaced, semi-cylindrical grooves 14 which constitute the engaging surfaces of the flywheel side of the clutch. A driving key or pawl 15 is adapted to be turned into and out of engagement with the walls of registering grooves 14 in a manner hereinafter described and furnishes the driving connection between the flywheel 10 and the shaft 11. The pawl or key 15 comprises a cylindrical member mounted in a suitable recess 16 in the shaft 11 and at its end in recesses in supports 17 fixed to the shaft 11. Intermediate its ends, the pawl 15 is cut away so that its outer surface is curved as shown at 15′ on a radius coinciding with the radius of the driven shaft 11 in which the key is seated so that in one position of its movement the center part of the key will be flush with the adjacent shaft surfaces and form a continuation of the latter. As shown in Fig. 1, the reduced portion of the pawl is confined substantially to the central part axially coextensive with the clutch collar 13.

The pawl 15 is urged to turn in its seat 16 in one direction by a torsion spring 18 secured in a recess in the end of shaft 11 being held in stressed position by a plug 19. The plug 19 is kept from turning by a suitable setscrew 20′.

Figure 2:
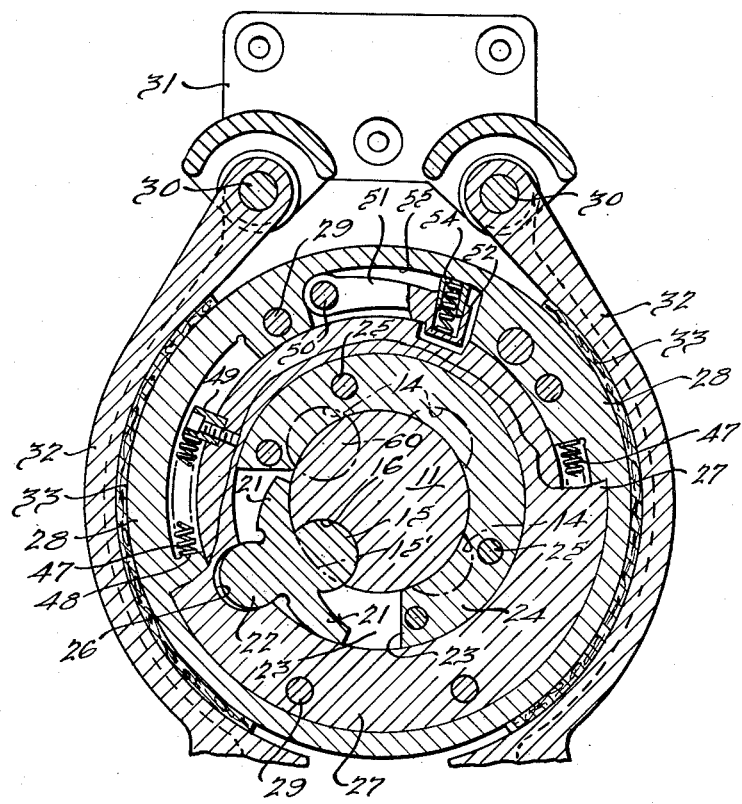
Fig. 2 is a sectional view taken substantially on the plane indicated by line 2—2 of Fig. 1, showing the clutch disengaged and the brake applied.

At one end, the pawl 15 is provided with a pair of opposed laterally extending arms 21 and a perpendicularly extending arm or projection 22. The arms 21 serve to limit the turning movement of the pawl 15 and operate in a recess 23 formed in a mounting ring 24 which is secured to the shaft 11 by a key 20. The mounting ring 24 is secured by bolts 25 to a sleeve 40 mounted on the shaft 11 in extension of the clutch collar 13. The arm or projection 22 engages in a recess 26 in a clutch control or latch ring 27 of such depth as to permit the overcenter movement of the arm relative to the shaft 11. When the control ring 27 is rotated relative to shaft 11 in one direction, the pawl 15 engages in one of the grooves 14 of the clutch collar 13 and when rotated in the opposite direction the pawl 15 is disengaged from the clutch collar. As best shown in Fig. 2, the arms 21 are each provided with surfaces coinciding with the radii of the shaft 11 and control ring 27 and alternately engage these surfaces in the rocking movement of the pawl 15.

Figure 3:
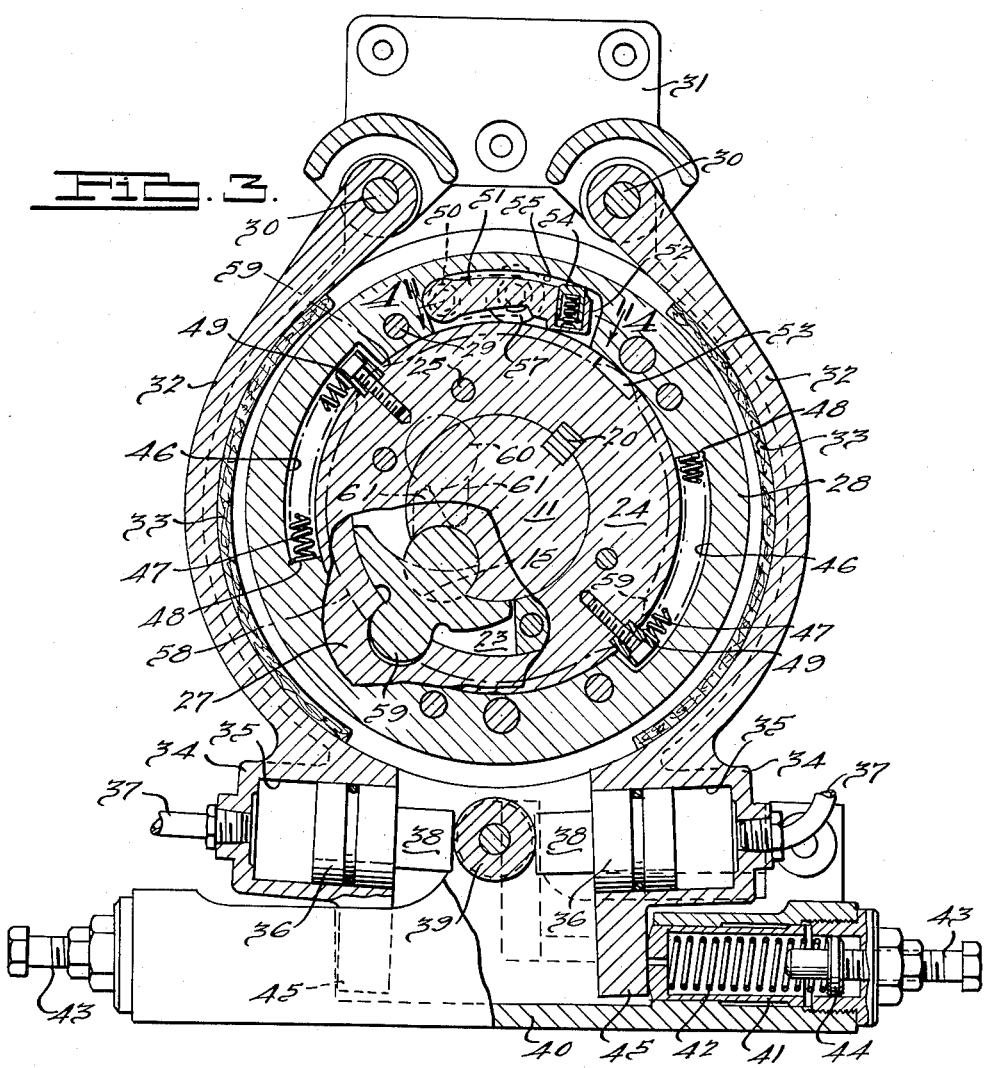
Fig. 3 is a sectional view taken substantially on the plane indicated by line 3—3 of Fig. 1, showing the clutch engaged and the brake released.
Figure 4:
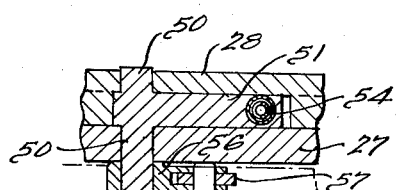
Fig. 4 is a fragmentary sectional view taken substantially on the plane indicated by line 4—4 of Fig. 3, showing details of the timing control latch means.

Surrounding the control ring 27 and the mounting ring 24 is a brake drum 28, secured to the control ring as by means of bolts 29. Pivotally mounted as at 30 to a fixed bracket 31 is a pair of brake bands or arms 32 provided with brake linings 33 adapted, when the brakes are applied, to engage the brake drum 28. The brakes may be actuated in various ways, but as illustrated in Fig. 3 the brake bands 32 are provided with enlarged portion 34 formed with cylinders 35 in which pistons 36 operate. These pistons 36 are moved toward one another by a fluid medium supplied to the cylinders through conduits 37 and when thus actuated projections 38 on the pistons engage a fixed abutment or stop 39 with the result that the lower or free ends of the brake bands 32 are forced apart and the brake released. Mounted in a bracket 40 below the abutment 39 is a pair of plungers 41 normally biased toward one another by springs 42, the tension of which is adjustable by setscrews 43 acting on adjustable stops 44. The plungers 41 engage extensions 45 on the brake bands 32 and act to apply or engage the brake bands to the brake drum 28. Thus, the brakes are applied by the spring means 41, 42, etc., and are released by the piston and cylinder means 35, 36, etc.

Mounted in arcuate recesses 46 formed in the inner surface of the brake drum 28 are springs 47. One end of each spring engages an end 48 of its recess and the other end engages a stop 49 in the form of a pin projecting from the periphery of the mounting ring 24. When the brake is applied and rotation of the drum 28 stopped, the springs 47 are compressed by a continued limited relative rotation between the drum 28 and mounting ring 24. The control ring 27 which is secured to the brake drum 28 by bolts 29 is also stopped and the relative rotation between the control ring 27 and shaft 11 disengages the pawl 15 and rotation of the shaft is stopped by movement of the arm 22 from the position illustrated in Fig. 2 to the position illustrated in Fig. 3.

Pivotally mounted between the brake drum 28 and the control ring 27 on a pivot 50 is a timing control latch 51, the free end 52 of which is adapted to enter and engage a notch or recess 53 formed on the outer periphery of the mounting ring 24. This occurs after relative rotation takes place between the brake drum 28 and mounting ring 24 and retains the springs 47 in compressed position. A spring pressed plug 54 carried by the free end 52 of the latch 51 engages the wall 55 of a recess in the brake drum to normally urge the latch in a direction to engage the recess 53. Fixed on an extension of the pivot of the latch 51 is an arm 56 which carries at its free end a roller 57 adapted to ride on a cam ring 58 carried by the bearing ring 12 which rotates with flywheel 10. This cam ring has a number of high spots or camming surfaces 59 corresponding to the number of clutch grooves 14, here shown as four, provided in the clutch collar 13. These cam surfaces 59 are located in radial and circumferential alignment with the clutch grooves 14 so that the release of the timing control latch 51 from the recess 53 is synchronized with the proper position of the pawls 15 relative to the clutch grooves 14 to insure a full engagement of the clutch at all times and prevent damage to the engaging surfaces of the clutch due to imperfect or premature engagement.

In other words, the release of the clutch control ring 27 for movement to permit engagement of the pawl 15 with a clutch groove 14 follows the lifting of the timing control latch 51 from the recess 53 and this occurs when a cam surface 59 engages the roller 57. The brake having been released, this permits the springs 47 to rotate the drum 28 and the control ring 27 to move the pawl 15 into clutching engagement with a registering clutch groove. It will be understood that while the pawl 15 is already biased by the spring 18, it cannot be rolled into clutching position until movement of the control ring is permitted as above described and in view of the size of the ring is assisted by the springs 47.

With certain presses in which a heavy slide is used or in which for some other reason the slide tends to slip and move faster than the wheel, a means to effectively lock the two parts together against movement in both directions is essential. For this reason a backing pawl 60 is provided, but forms no part of the present invention. This backing pawl enters one of the grooves 14 of the clutch collar 13 upon rotating in a direction opposite to the direction of the driving pawl 15, in a manner well known in the art.

If desired, a second brake (not shown) might be installed on the shaft 11 to prevent rotation of the shaft in the opposite direction when, for instance, the press is stopped on the upward movement of the slide. Such a brake could be actuated by the hereindescribed brake operating mechanism, or separately, and either simultaneously with or in delayed sequence to the present brake.

With the structure heretofore described, the clutch may be disengaged at any point throughout the entire 360° of rotation of the driving and driven clutch parts by application of the brakes 32. This causes a rotation of the control ring 27 relative to the driven shaft 11 and disengages the pawl 15 from the clutch groove 14. At the same time relative rotation between the brake drum 28 and mounting ring 24 compresses springs 47 and positions the latch 51 for engagement with the recess 53 in the periphery of the mounting ring 24. To engage the clutch parts, the brake is released and when the latch 51 is disengaged from the recess 53 by a cam surface 59, the springs 47 will rotate the drum 28 and the control ring 27 to move the pawl into clutching engagement with a clutch groove 14. The release of the latch 51 is timed or synchronized with the position of the grooves 14 because the cam surfaces 59, which release the latch 51, are in circumferential alignment with the clutch grooves 14 and hence the control ring 27 is released for movement to permit engagement of the pawl 15 in properly timed relation to the next approaching clutch groove 14. A pair of teeth 61 interconnects the pawls 15 and 60 and produces the actuation of pawl 60 when the pawl 15 is actuated.

While the invention has been described as associated with a particular form of clutch assembly, it is capable of numerous modifications and changes in form and disposition of the parts. It should be understood that such modifications and changes may be made without departing from the invention as defined in the appended claims.

What is claimed is:

1. In a clutch, a drive member, a driven member, one of said members having a clutch recess, an elongated clutch element carried by the other of said members and rotatable about its longitudinal axis relative thereto into and out of engagement with said recess to positively lock said two members together, control means for rotating said clutch element about its longitudinal axis into and out of engagement with said clutch recess, and brake means for actuating said control means during the rotation of said members at any point throughout the rotation thereof and means biasing said control means in a direction to cause said clutch element to enter said recess.

2. In a clutch, a drive member, a driven member, one of said members having a clutch recess, an elongated clutch element carried by the other of said members and rotatable about its longitudinal axis relative thereto into and out of engagement with said recess to positively lock said two members together, control means for rotating said clutch element about its longitudinal axis out of clutching engagement with said clutch recess, brake means for actuating said control means during the rotation of said members, and locking means for retaining said control means in clutch disengaging position.

3. In a clutch, a drive member, a driven member, one of said members having a clutch recess, a clutch element carried by the other of said members and rotatable relative thereto into and out of clutch engagement with said recess, control means for moving said clutch element into and out of engagement with said recess, brake means for actuating said control means, latch means for holding said clutch element out of engagement with said recess, and means movable with the drive member for releasing said latch means in timed relation to the circumferential position of a clutch recess.

4. In a rolling key type clutch, having driving and driven members, one of said members having a clutch recess, a clutch element carried by the other of said members and rotatable relative thereto into and out of clutch engagement with said recess, a control member for actuating said clutch element, brake means for actuating said control member, latch means associated with said brake means for holding said clutch element in disengaged position, and means operable upon release of said brake means for releasing said latch means in timed relation to the circumferential position of a clutch recess.

5. In a rolling key type clutch, having driving and driven members, one of said members having a clutch recess, a clutch element carried by the other of said members and rotatable relative thereto into and out of clutch engagement with said recess, a control member for actuating said clutch element, brake means for actuating said control member, latch means associated with said brake means for holding said clutch element in disengaged position, means operable upon release of said brake means for releasing said latch means, and cam means carried by the driving member for releasing said latch means upon release of said brake means in timed relation to the circumferential position of a clutch recess.

6. In a rolling key type clutch, having driving and driven members, one of said members having a clutch recess, a clutch element carried by the other of said members and rotatable relative thereto into and out of clutch engagement with said recess, a control member for actuating said clutch element, brake means for actuating said control member, latch means associated with said brake means for holding said clutch element in disengaged position, means operable upon release of said brake means for releasing said latch means, and cam means carried by the driving member and operating upon release of the brake means for releasing said latch means in timed relation to the relative circumferential position of a clutch recess and said clutch element.

7. In a rolling key type clutch, having driving and driven members, one of said members having a clutch recess, a clutch element carried by the other of said members and rotatable relative thereto into and out of clutch engagement with said recess, a control ring for moving said clutch element into and out of engagement with said clutch recess, a spring engaging said clutch ring, and brake means for actuating said control ring to move the same to clutch disengaging position when said brake is applied and for tensioning said spring, said spring moving said control ring to move the same to clutch engaging position when said brake is released.

8. In a rolling key type clutch, having driving and driven members, one of said members having a clutch recess, a clutch element carried by the other of said members and rotatable relative thereto into and out of clutch engagement with said recess, a control ring for moving said clutch element into and out of engagement with said clutch recess, brake means for actuating said control ring to move the same to clutch disengaging position when said brake is applied and to clutch engaging position when said brake is released, latch means for holding said clutch in disengaged position, and cam means carried by the driving member for releasing said latch means in time relation to the relative circumferential position of a clutch recess and said clutch element.

9. In a rolling key type clutch having driving and driven members, one of said members having a clutch recess, a clutch element carried by the other of said members and rotatable relative thereto into and out of clutch engagement with said recess, a control ring for rotating said clutch element into and out of engagement with said clutch recess, brake means having a brake drum connected to said control ring for actuating the same, a mounting ring mounted within said brake drum, springs interposed between portions of said brake drum and mounting ring and adapted to be compressed upon relative rotation of said brake drum and mounting ring, a latch engageable with said mounting ring for holding the same against rotation when said springs are compressed, and cam means carried by said driving member for releasing said latch when said brake means is released to cause said brake drum to actuate said control to rotate said clutch element into engagement with a clutch recess.

10. In a rolling key type clutch, having driving and driven members, one of said members having a clutch recess, a clutch element carried by the other of said members and rotatable relative thereto into and out of clutch engagement with said recess, a control ring for actuating said clutch element, friction type brake means including a brake drum for actuating said control ring whereby when said brake is applied said control ring rotates said clutch element out of engagement with said clutch recess, spring means biased when said brake is applied tending to actuate said control ring to rotate said clutch element into engagement with said clutch recess, latch means preventing said actuation of the control ring when the brake is released, and cam means carried by said driving member for releasing said latch means.

References Cited in the file of this patent

UNITED STATES PATENTS

| | | |
|---|---|---|
| 1,330,193 | Krause | Feb. 10, 1920 |
| 1,872,450 | Henneuse | Aug. 16, 1932 |
| 2,045,483 | Mueller | June 23, 1936 |
| 2,175,290 | Gustafson | Oct. 10, 1939 |

FOREIGN PATENTS

| | | |
|---|---|---|
| 27,964 | Great Britain | Dec. 12, 1911 |